United States Patent [19]

Smith et al.

[11] Patent Number: 5,290,059
[45] Date of Patent: Mar. 1, 1994

[54] AIR BAG MODULE WITH A CENTER MOUNTED TUBULAR INFLATOR

[75] Inventors: Bradley W. Smith, South Ogden; Gary V. Adams, Brigham City; Kirk Rasmussen, West Point, all of Utah

[73] Assignee: Morton International, Inc., Chicago, Ill.

[21] Appl. No.: 53,285

[22] Filed: Apr. 28, 1993

[51] Int. Cl.⁵ .............................................. B60R 21/26
[52] U.S. Cl. .............................. 280/728 A; 280/731; 280/736; 280/740; 280/741
[58] Field of Search .............. 280/728 A, 728 R, 740, 280/741, 731, 732, 736, 743 R

[56] References Cited

U.S. PATENT DOCUMENTS

| | | | |
|---|---|---|---|
| 3,778,084 | 12/1973 | Sutherland et al. | 280/741 |
| 4,915,410 | 4/1990 | Bachelder | 280/732 |

FOREIGN PATENT DOCUMENTS

| | | | |
|---|---|---|---|
| 4-92735 | 3/1992 | Japan | 280/728 R |
| 2247214 | 2/1992 | United Kingdom | 280/728 A |
| 2257400 | 1/1993 | United Kingdom | 280/728 A |

*Primary Examiner*—Eric Culbreth
*Attorney, Agent, or Firm*—Gerald K. White

[57] ABSTRACT

An air bag module using a tubular inflator uses a different housing, retaining ring, cushion and inflator bracket than are currently used, with the appearance and function of the module not being changed but only the internal components. The inflator is placed in a slotted section of the module housing with the diffuser thereof protruding from the center through a hole in a raised portion of the module housing slotted section, which hole is sized closely to the size of the diffuser. The diffuser extends directly into the module at a 90° angle to the plane surface of the housing. The retaining ring has raised portions in the center thereof to match the raised portion of the module housing, has holes in the raised portions, and has tabs which extend through holes in the cushion and the module housing. The module housing has tabs on the raised portion thereof which extend through holes in the cushion and retaining ring. The cushion uses a rectangular mounting so that the cushion can match the radius of the module housing in the raised portion which goes over the tubular inflator. The retaining bracket extends around the back side of the inflator to hold it in place and includes cover retaining brackets incorporated therein. Studs which hold the module together extend from the retaining ring through holes in the cushion, module housing, and retaining bracket.

12 Claims, 5 Drawing Sheets

AIR BAG MODULE WITH A CENTER MOUNTED TUBULAR INFLATOR

BACKGROUND OF THE INVENTION

1. Field of the Invention

This invention relates to an air bag module for use on the driver side of automotive and other vehicles wherein an inflatable air bag or cushion is inflated in the event of a collision to protect the driver from injury that could result from being forcibly thrown against the steering wheel, dashboard, etc. The air bag module uses a tubular inflator assembly.

2. Description of the Related Art

Inflator assemblies that currently are in use in driver side air bag modules, as disclosed, for example, in U.S. Application for Patent bearing Ser. No. 07/820,826, filed Jan. 15, 1992 by Gary V. Adams and Bradley W. Smith, pending typically are toroidal types having flat, disk-like shapes with the dimensions of the inflator assembly typically being about two inches (2") thick and four inches (4") in diameter, much of the inflatable cushion stored in the air bag module is folded in front of the inflator assembly as opposed to the sides thereof. While an inflator assembly having a tubular shape would allow much of the cushion to be folded on the sides thereof in an air bag module, a tubular inflator assembly will not fit in driver side air bag modules as they are currently designed.

Inflator assemblies of the toroidal type produce a cushion inflating gas source from a combustible gas generating material which, upon ignition, generates a quantity of gas sufficient to inflate the cushion. One form of tubular inflator assembly similarly is operative to generate gas for inflating cushions from a combustible gas generating material. In another form of tubular inflator assembly, however, the cushion inflating gas results from a combination of stored compressed gas and a gas generating material. The latter form of tubular inflator assembly is commonly referred to as an augmented gas or hybrid inflator. Hybrid inflators affect the performance of air bag modules in several ways including variation in the amount of stored gas, the transmission of heat to the stored gas and the rate at which the inflating gas is dispensed into the inflatable cushion.

There is a need and a demand to provide a driver side air bag module in which a tubular inflator assembly may be used to facilitate folding of much of the cushion on the sides of the inflator and to affect the performance of the air bag module. The present invention was devised to fill the technological gap that has existed in the art in these respects.

SUMMARY OF THE INVENTION

An object of the invention is to provide an air bag module for the driver side of an automotive or other vehicle which module uses a tubular inflator assembly.

Another object of the invention is to provide such an air bag module in which the tubular inflator assembly is mounted in the center of the module.

Still another object of the invention is to provide such an air bag module in which the tubular inflator assembly is of the augmented gas or hybrid type.

A further object of the invention is to provide such an air bag module in which the tubular inflator assembly is held very firmly in position within the air bag module during the life of the module.

Another object of the invention is to provide such an air bag module in which the inflating gas discharge exit openings of the tubular inflator assembly are substantially sealed within the inflating gas inlet opening of the inflatable cushion stored in folded condition within the air bag module.

An additional object of the invention is to provide such an air bag module in which the tubular inflator assembly is of the "thrust neutral" type in which the gas discharge openings are so positioned that upon initiation of the inflator assembly the gas is discharged in opposing directions whereby there are no resulting forces tending to cause movement of the inflator assembly.

In accomplishing these and other objectives of the invention, there is provided, in cooperative relation with a tubular inflator assembly, a different housing, retaining ring, folded cushion, and retaining bracket to assemble a driver side air bag module than are used in current designs. The appearance and function of the driver side air bag module according to the invention are not changed insofar as the purchaser of an automotive or other vehicle, in which the air bag module is installed, would be concerned. Only the internal components of the air bag module are changed.

In a preferred embodiment of the invention, the tubular inflator assembly is a hybrid type such as that disclosed in U.S. Application bearing Ser. No. 07/989,854, filed Dec. 14, 1992 by Bradley W. Smith, allowed and comprises a pressure vessel including a storage chamber that is filled and pressurized with an inert gas such as Argon or Nitrogen to a pressure typically in the range of 2000–4000 psi. The storage chamber is defined by an elongated tube or sleeve. A first end of the sleeve is closed by a fill plug. A pyrotechnic heater is recessed in sealing relation into the storage chamber from a second end of the sleeve. A diffuser protrudes, that is, projects outwardly in sealing relation at substantially a 90° angle from the exterior surface of the sleeve at a location intermediate the first and second ends thereof. Provided in the diffuser are a plurality of gas exit ports or orifices for dispensing inflating gas uniformly in opposing directions in a thrust neutral manner from the pressurized chamber.

The tubular inflator assembly is placed in a slotted section with a curved wall of a flat base member of the module housing, which section runs the width of the module housing centrally thereof. The diffuser of the tubular inflator assembly protrudes from a position intermediate the ends of the inflator assembly through a hole in a raised portion of the slotted section of the module housing. This hole is sized closely to the size of the diffuser so that the inflator assembly is fixedly attached to and made firm in position with respect to the module housing. The diffuser of the inflator assembly extends directly into the module housing at substantially a 90° angle to the plane surface thereof and in substantial sealing relation therewith.

The retaining ring in the air bag module for clamping the inflatable cushion to the module housing and the tubular inflator assembly is not flat as in modules of current design. Instead, it has upwardly curved slotted sections in the center of the ring to match the upwardly curved slotted section of the module housing.

The retaining ring is used without rivets. It has tabs on the top and bottom of the housing and holes in the ring on the grooved portions. The module housing has tabs on it in the grooved portion which extend through holes in the cushion and the retaining ring. Fasteners or studs, which have been pressed into the ring, extend through the cushion, module housing, and a retaining bracket. The module is held together with nuts on the studs.

The cushion used in the module has a different mounting arrangement than the cushions in modules of current design. Instead of a round mounting in the cushion, as in modules of current design, the cushion according to the invention uses a more rectangular mounting. This is provided so that the cushion, when attached to the retaining ring and module housing, can match the radius of the module housing in the grooved portion thereof which goes over the tubular inflator assembly.

The retaining bracket of the air bag module extends around the back side of the tubular inflator assembly to hold it in place. Module cover retaining brackets are incorporated in the retaining bracket so that it is a unitary member or system instead of three pieces. The radius of the retaining bracket is made such that, when nuts on the studs, which hold the air bag module together, are torqued down, the tubular inflator assembly is held very firmly in position and will be so held during the life of the air bag module.

The mounting points of the air bag module for the attachment thereof to the steering wheel of an automotive or other vehicle are located on the module housing. A typical mounting arrangement for the module assembly may comprise a four-point attach system.

The various features of novelty which characterize the invention are pointed out with particularlity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this summary of the invention, a detailed description follows with reference being made to the accompanying drawings which form part of the specification, of which.

DESCRIPTION OF THE PREFERRED EMBODIMENT

Figure 1:
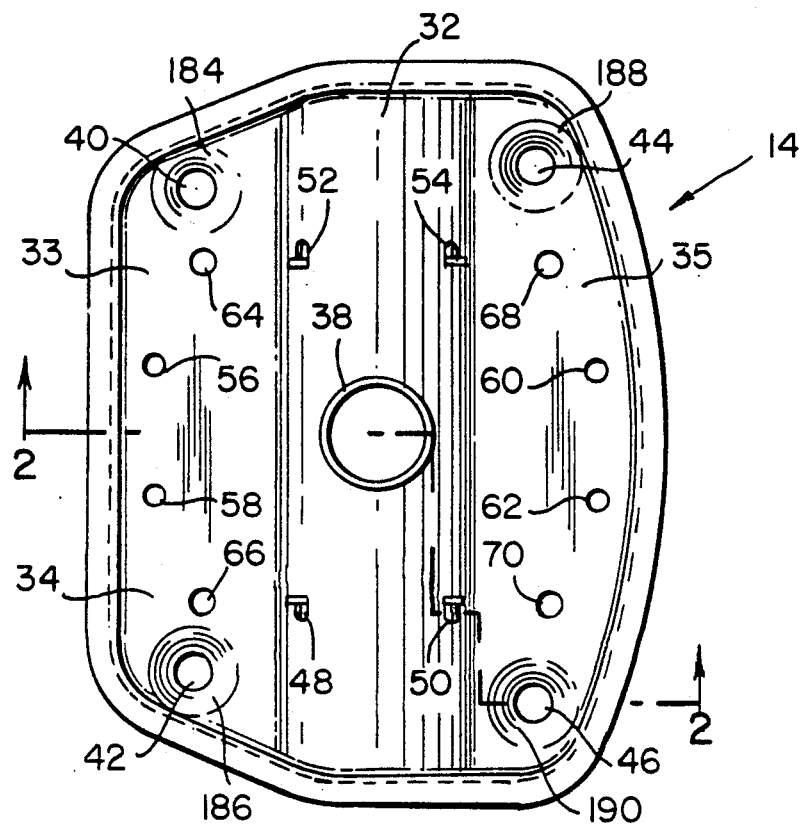
FIG. 1 is a top view of the module housing according to the invention.

Referring to the figures of drawing, an air bag module 10 according to the invention comprises a tubular inflator assembly 12, a module housing 14, a retaining ring 16, a folded inflatable cushion 18, a module cover 20, and a retaining bracket 22.

Figure 10:
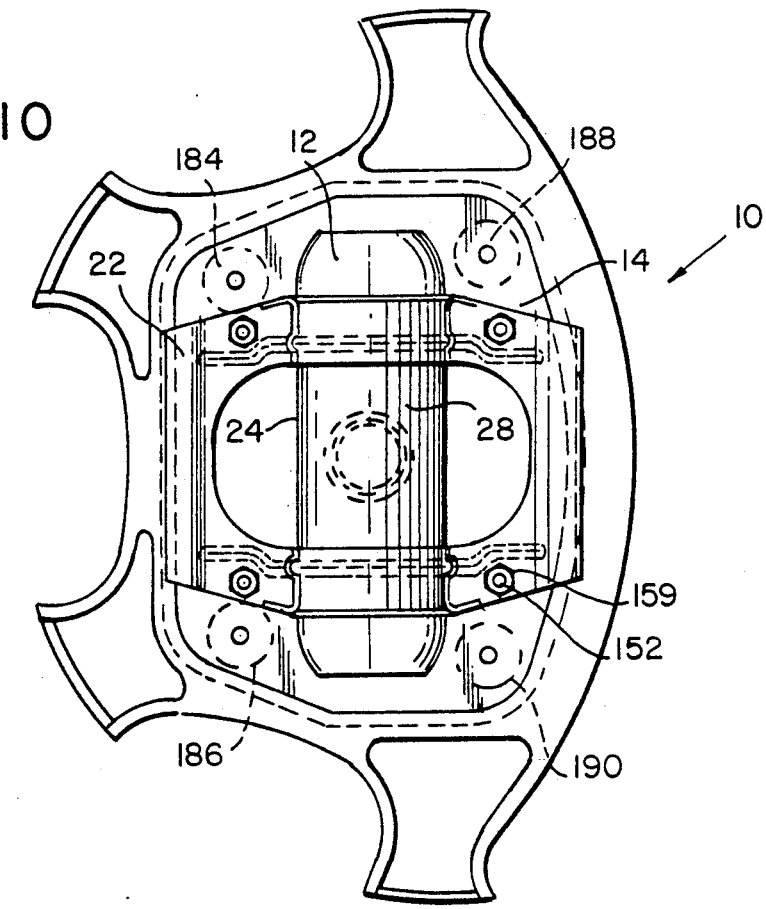
FIG. 10 is a bottom view of the module assembly according to the invention.
Figure 11:
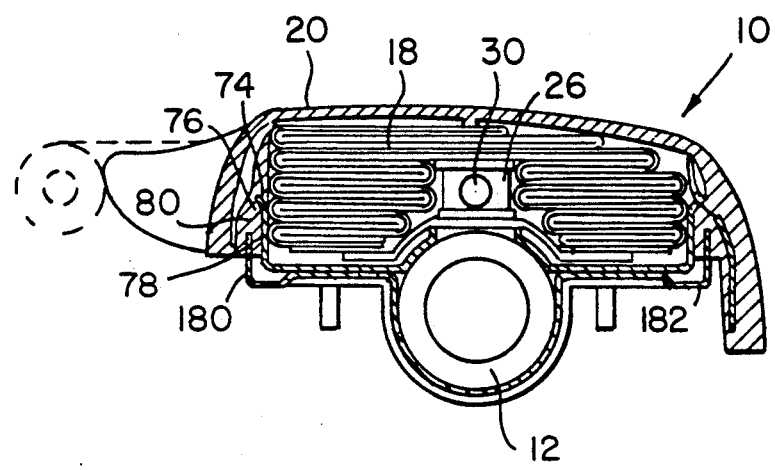
FIG. 11 is a sectional view of the module assembly taken along the lines 11—11 of FIG. 10.

The tubular inflator assembly 12, as shown in FIGS. 10 and 11, includes an elongated sleeve or tube 24 and a diffuser 26. The diffuser 26, as best seen in FIG. 11, projects outwardly from the exterior surface 28 of the sleeve 24 at substantially a 90° angle. A plurality of gas exit ports or orifices 30 facing in different directions in the diffuser 26 dispense inflating gas in a thrust neutral manner so that upon initiation of the tubular inflator assembly 12 and flow of gas through ports 30 there are no forces that tend to cause disruptive movement of the inflator assembly 12 in the air bag module 10.

Figure 2:
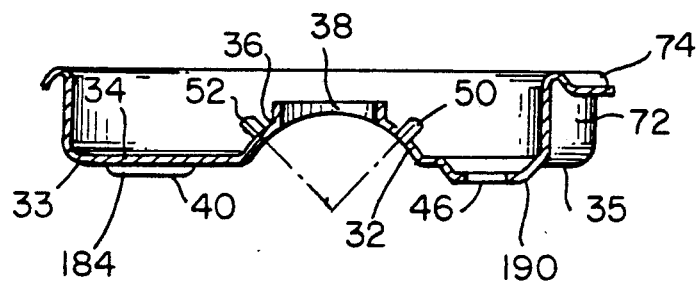
FIG. 2 is a sectional view of the module housing of the air bag module taken along the lines 2—2 of FIG. 1.

The tubular inflator assembly 12 is placed in a slotted section 32 having a curved wall of a flat base member 34 of the module housing 14. As illustrated in FIG. 1, the slotted section 32 runs the width of the base member 34 of the module housing 14 between base portions 33 and 35 which are positioned in the same plane. Centrally located in a raised portion 36 of the slotted section 32, as seen in FIG. 2, is an opening or hole 38 through which the diffuser 26 of the tubular inflator assembly 12 extends, as best seen in FIG. 11. In accordance with the invention, the size of the opening or hole 38 closely conforms to the size, that is, the diameter, of the generally cylindrical shape diffuser 26.

The module housing 14 includes four holes 40, 42, 44 and 46 that provide a four-point attach system for the air bag module 10, that is, for the attachment thereof to the steering wheel of an automotive or other vehicle. Four upwardly extending tabs 48, 50, 52 and 54 in the raised portion 36 of the slotted section 32 of the module housing 14, two holes 56 and 58 in the base plane portion 33 thereof, and two holes 60 and 62 in the base plane portion 35 thereof provide a means for the attachment thereto of the retaining ring 16. Four holes 64, 66, 68 and 70 provide a means for the attachment to the module housing 14 of the retaining bracket 22.

The module housing 14 further includes a completely surrounding upwardly extending wall 72. The upper edge of the wall 72 is curled outwardly forming a rolled-over lip 74, as shown in FIG. 2. Lip 74 engages and is locked in mating relation in a groove 76 in the side wall 78 of an inner portion 80 of cover 20, as best seen in FIG. 11, when the module housing 14 and the folded inflatable cushion 18 are pressed in place within the cover 20.

Figure 3:
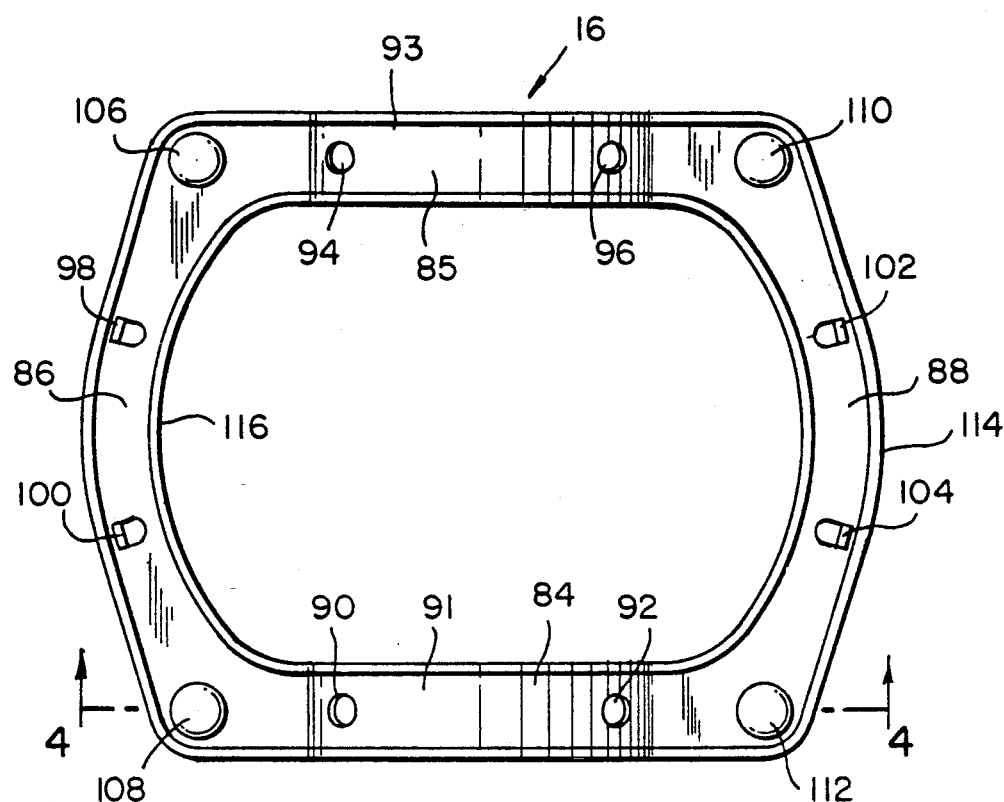
FIG. 3 is a top view of the retaining ring of the air bag module.
Figure 4:
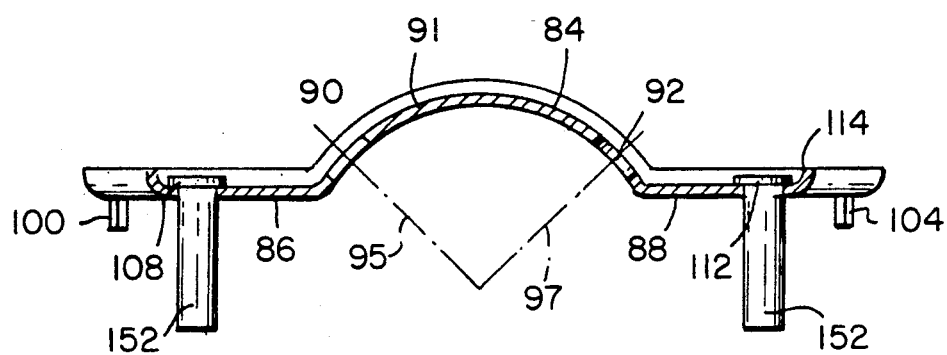
FIG. 4 is a sectional view of the retaining ring taken along the lines 4—4 of FIG. 3.

Retaining ring 16, as shown in FIGS. 3 and 4, includes two spaced slotted sections 84 and 85, each of which has a curved wall. The slotted section 84 is positioned between retaining ring base members 86 and 88 at one end thereof and the slotted section 85 is positioned between the base members 86 and 88 at the other end thereof, with the base members 86 and 88 being positioned in the same plane. Raised portions 91 and 93 are associated with slotted sections 84 and 85, respectively. Spaced holes 90, 92 and 94, 96 are provided in raised portions 91 and 93, respectively, with holes 90 and 94 positioned adjacent base portion 86 and holes 92 and 96 positioned adjacent base portion 88. As indicated in FIG. 4, the positioning of the pairs of holes 90, 92 and 94, 96 is such that the angle formed between dotted straight lines 95 and 97 drawn from the centers of holes 90, 92 and 94, 96 through the center of the curves of the curved slotted sections 84 and 85 is substantially 90°, that is, a right angle.

The retaining ring 16 further includes spaced downwardly extending tabs 98 and 100 provided in the base portion 86 and spaced downwardly extending tabs 102 and 104 provided in the base portion 88. Also included in retaining ring 16, in base portion 86, are spaced holes 106 and 108, and in base portion 88, spaced holes 110 and 112.

The retaining ring 16 includes at the periphery, that is, the perimeter thereof, an upwardly curled edge 114. At the inner boundary thereof, the retaining ring 16 includes an upwardly curled edge 116 that is similar to the curled edge 114.

The retaining ring 16 can be made of any suitable material such as aluminum or steel, with steel being preferred for strength and rigidity.

Figure 5:
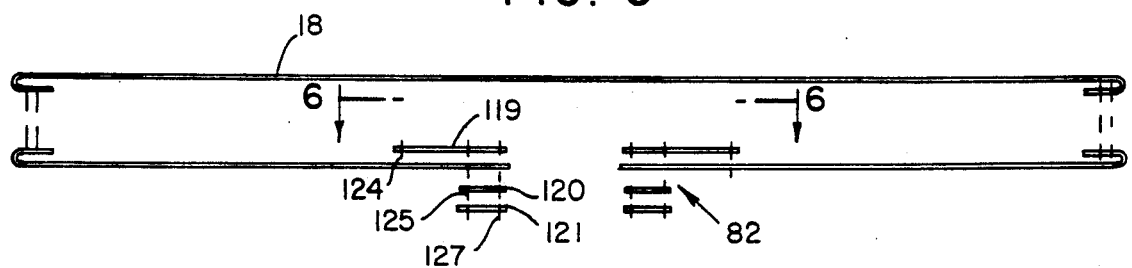
FIG. 5 is a fragmented side view of the cushion in a planar deflated condition prior to the assemblage thereof by sewing.
Figure 6:
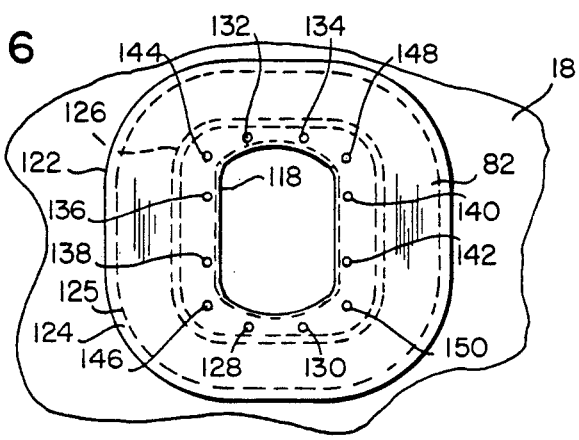
FIG. 6 is a sectional view of the inflating gas inlet opening of the cushion taken along the lines 6—6 of FIG. 5.

In FIGS. 5 and 6 here is illustrated a portion 82 of the folded inflatable cushion 18, which portion contains a substantially rectangular inflating gas inlet opening 118. The gas inlet opening 118 is rectangular so that the portion 82 of cushion 18 can match the radius of the module housing 14 in the slotted section 32 thereof which goes over the tubular inflator assembly 12. Provided in supporting relation to the gas inlet opening 118 of cushion 18 are reinforcing patches 119, 120 and 121 of suitable material. Patch 119 has an outer boundary at 122 and is attached internally of cushion 18 by stitching as indicated at 124, 125 and 127. Patches 120 and 121 have an outer boundary at 126 and are attached externally of cushion 18 by stitching, as indicated at 125 and 127.

Surrounding the gas inlet opening 118 of cushion portion 82, as shown in FIG. 6, are a number of holes that match in position the holes or tabs that are provided in the retaining ring 16. Specifically, the holes 128, 130, 132 and 134 in cushion portion 82 match in position the retaining ring holes 98, 100, 102 and 104, respectively. Holes 136, 138, 140 and 142 in cushion portion 82 match in position the retaining ring tabs 96, 94, 92 and 90, respectively. Holes 144, 146, 148 and 150 in cushion 82 match in position the retaining ring holes 110, 106, 112 and 108, respectively.

In the assembly of the air bag module 10, the retaining ring 16 is inserted inside the cushion 18 through the gas inlet opening 118. Fasteners or studs 152 are inserted through each of the holes 106, 108, 110 and 112 of the retaining ring 16 and through each of the respectively associated holes 146, 150, 144 and 148 of the cushion 18. In addition, the tabs 98, 100, 102 and 104 of the retaining ring 16 extend through the respectively associated holes 128, 130, 132 and 134 of the cushion 18.

When the retaining ring 16 and the attached cushion 18 are brought into cooperative relation, that is, assembled position, with the module housing 14, the studs 152 extend through holes 64, 66, 68 and 70 of the module housing 14. In addition, downwardly extending tabs 98, 100, 102 and 104 on the retaining ring 16 extend through respectively associated holes 56, 58, 60 and 62 of the module housing 14. Also, tabs 48, 50, 52 and 54 on the raised portion 36 of the slotted section 32 of the module housing 14 extend through respectively associated holes 142, 140, 138 and 136 of the cushion 18 and through respectively associated holes 90, 92, 94 and 96 of the retaining ring 16.

In accordance with the invention, the module housing 14 is held in place during assembly of the air bag module housing 14 prior to the attachment thereto of the tubular inflator assembly 12 and the retaining bracket 22 by the use of slightly undersized module housing fastener holes 64, 66, 68 and 70, which fastener holes grip the walls of the studs 152.

Figure 12:
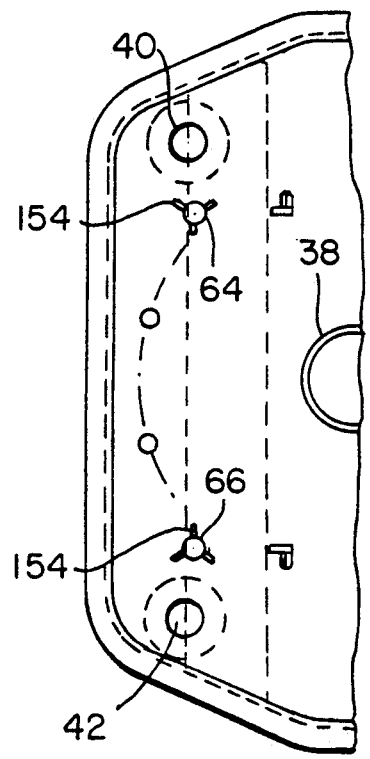
FIG. 12 is a fragmented top plan view of the module housing illustrating undersized stud fastener holes.

Alternatively, as illustrated in FIG. 12, notches 154 cut radially around the circumference of the holes 64, 66, 68 and 70 may be provided to reduce the circumferential strength of these holes thus permitting the edges of the holes to deform and engage the wall of the associated stud 152 when the retaining ring 16 and attached portion of cushion 82 are pressed in place in the module housing 14.

Thus, the cushion 18 is held firmly between the retaining ring 16 and the module housing 14 during assembly of the remainder of the assembly of the air bag module 10. Following such attachment of the retaining ring 16 and cushion 18 to the module housing 14, the cushion 18 is folded and module cover 20 is attached to the module housing 14 with the folded cushion 18 stored therein.

At this stage, the tubular inflator assembly 12 is positioned in the slotted or grooved section 32 and attached by the retaining bracket 22 to the module housing 14 with the diffuser 26 extending through the hole 38 into the gas inlet opening 118 of the cushion 18.

The retaining bracket 22 of the air bag module 10 extends around the back side of the tubular inflator assembly 12, as best seen in FIGS. 10 and 11 and holds it in place thereagainst.

Figure 7:
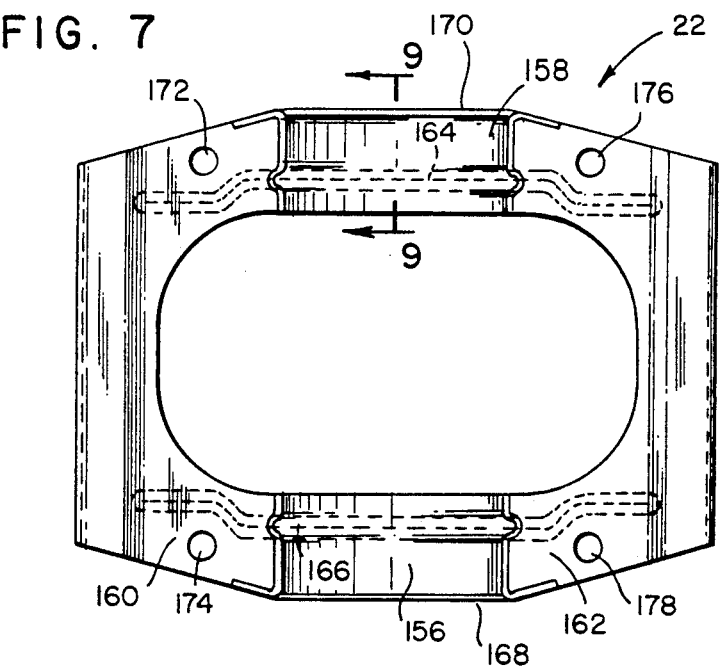
FIG. 7 is a bottom view of the retaining bracket of the air bag module.
Figure 8:
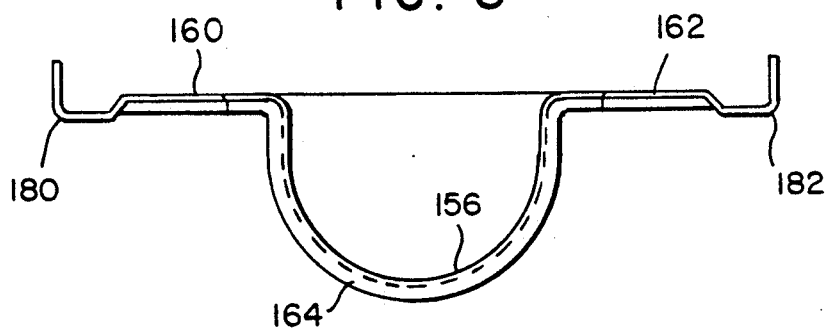
FIG. 8 in end view of the retaining bracket.

As shown in FIGS. 7 and 8, the retaining bracket 22 includes two spaced slotted sections 156 and 158. Each of the slotted sections 156 and 158 has a curved wall the curvature of which matches the curvature of the exterior surface of the tubular inflator 12. The slotted section 156 is positioned between retaining bracket base members 160 and 162 at one end thereof. Between the base members 160 and 162, at the other end thereof, the slotted section 158 is positioned. The base members 160 and 162 are positioned in the same plane.

Figure 9:
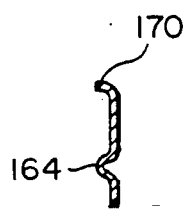
FIG. 9 is a sectional view of the retaining bracket taken along the lines 9—9 of FIG. 7.

The slotted section 158, as shown in FIGS. 7, 8 and 9, include a strengthening rib 164 formed therein, which rib 164 extends into the base members 160 and 162. A similar strengthening rib 166 is also provided in the slotted section 156, which rib 166 also extends into the base members 160 and 162. In addition, as shown in FIG. 9, each of the slotted sections 156 and 158 include at the outer boundary of the retaining bracket 22 a short curved strengthening wall 168 and 170, respectively, each of which walls extend into the regions of the base members 160 and 162.

Spaced holes 172 and 174 in base member 160 of retaining bracket 22 and spaced holes 176 and 178 in base member 162 provide a means for the attachment of the retaining bracket 22 to the air bag module 10. Holes 172 and 174 correspond in position to holes 64 and 66 of the module housing 14. Similarly, holes 176 and 178 correspond in position to holes 68 and 70 of the module housing 14. Thus, studs 152 extend through holes 172, 174, 176 and 178 when the retaining bracket is placed in position to hold the tubular inflator 12 to the module housing assembly 14.

The radius of the slotted sections 156 and 158 of the retaining bracket 22 is made such that when nuts 159 screwed on the fasteners or studs 152 are torqued down, the inflator assembly 12 is held very firmly in position and will be so held during the life of the air bag module 10.

Cover retaining brackets 180 and 182 are incorporated, that is, formed integrally with the retaining bracket 22. The cover retaining brackets 180 and 182 cooperate with the module housing wall 72 and lip 74 to lock the cover 20 in place on the air bag module 10.

The mounting points of the air bag module 10 are located on the module housing 14 and comprise holes 40, 42, 44 and 46 which, as best seen in FIGS. 1, 2 and 10, are positioned in circular embossments 184, 186, 188 and 190, respectively. These holes facilitate the attachment by bolts or studs of the air bag module 10 to the steering wheel of an automotive or other vehicle.

Thus, in accordance with the invention, there has been provided an air bag module for the driver side of an automotive or other vehicle in which a tubular inflator assembly of thrust neutral type is employed. The tubular inflator assembly is mounted in the center of the air bag module, being held firmly in position therewithin with the inflating gas discharge exit openings thereof substantially sealed within the inflating gas inlet opening of the inflatable cushion stored within the air bag module.

With this description of the invention in detail, those skilled in the art will appreciate that modifications may be made to the invention without departing from the spirit thereof. Therefore, it is not intended that the scope of the invention be limited to the specific embodiment illustrated and described. Rather, it is intended that the scope of the invention be determined by the appended claims and their equivalents.

What is claimed is:

1. A vehicle air bag module comprising,
   a module housing including a flat base member having a slotted section with a curved wall running the width thereof and having an inflator diffuser opening formed in a raised portion of said slotted section at a position intermediate the ends thereof,
   a folded inflatable cushion having a gas inlet rectangularly shaped opening with an inner periphery,
   a retaining ring extending around the inner periphery of said gas inlet opening of said cushion, said retaining ring having slotted sections with curved walls that match and are disposed adjacent said slotted section of said base member of said module housing,
   a tubular inflator comprising a cylindrical housing and a diffuser extending at an angle of substantially 90° from said inflator at a position intermediate the ends thereof, said inflator being disposed in said slotted section of said main body of said module housing with said diffuser extending through said diffuser opening, and
   a retaining bracket having a slotted section that matches and is disposed adjacent to and extends around the back side of said tubular inflator to hold said inflator in place thereagainst.

2. A vehicle air bag module as set forth in claim 1, further including fastening means connected to said retaining ring holding said retaining bracket in position against said tubular inflator.

3. A vehicle air bag module as set forth in claim 1, wherein said diffuser opening in said raised portion of said slotted section of said module housing is sized closely to the size of tubular inflator diffuser so that said tubular inflator does not move in said air bag module.

4. A vehicle air bag module as set forth in claim 1, wherein said diffuser opening in said raised portion of said slotted section of said module housing is sized closely to the size of said diffuser of said tubular inflator so that said diffuser of said tubular inflator is substantially sealed within said gas inlet rectangularly shaped opening of said folded inflatable cushion.

5. A vehicle air bag module as set forth in claim 1, wherein said diffuser of said tubular inflator includes gas exit ports facing in opposing directions whereby when activated said tubular inflator is thrust neutral.

6. A vehicle air bag module as set forth in claim 5, wherein the shape of said diffuser of said tubular inflator is generally cylindrical, and
   the shape of said opening in the raised portion of the slotted section of said module housing is generally circular.

7. A vehicle air bag module as set forth in claim 1, wherein said module housing slotted section runs the width of said flat base member between portions thereof that are positioned in the same plane,
   wherein at least one upwardly extending tab is provided in the raised portion of said module housing slotted section adjacent each of said base member portions that are positioned in the same plane, and
   wherein said inner periphery of said gas inlet opening of said cushion and said slotted sections of said retaining ring include holes positioned therein through which said tabs of said raised portion of said module housing slotted section extend when the slotted sections of said retaining ring are disposed adjacent said slotted section of said base member of said module housing.

8. A vehicle air bag module as set forth in claim 7, wherein a plurality of upwardly extending tabs are provided in the raised portion of said module housing slotted section adjacent each of said base member portions that are positioned in the same plane.

9. A vehicle air bag module as set forth in claim 7, wherein each of said slotted sections of said retaining ring are positioned between base members of said retaining ring which are positioned in the same plane,
   wherein each of said base members of said retaining ring include a plurality of downwardly extending tabs, and
   wherein each of said base member portions of said module housing that are positioned in the same plane includes holes positioned therein through which said downwardly extending tabs from said retaining ring extend when said slotted sections of said retaining ring are disposed adjacent said slotted section of said base member of said module housing.

10. A vehicle air bag module as set forth in claim 9, wherein said module housing, said inner periphery of the gas inlet opening of said cushion, said retaining ring, and said retaining bracket each include a plurality of holes that are in alignment with similar holes in the other components recited, and
   fastening means for holding said retaining bracket very firmly against the back side of said tubular inflator and for holding said module housing, said inner periphery of said cushion, and said retaining ring against the front side of said tubular inflator, said fastening means comprising a stud extending through each of said aligned holes, and a nut torqued down adjacent said retaining bracket on each of said studs.

11. A vehicle air bag module as set forth in claim 1,
wherein each of said slotted sections of said retaining ring are positioned between base members of said retaining ring which are positioned in the same plane,
wherein each of said base members of said retaining ring include at least one downwardly extending tab, and
wherein each of said base member portions of said module housing that are positioned in the same plane includes at least one hole positioned therein through which said downwardly extending tabs from said retaining ring extend when said retaining ring slotted sections are disposed adjacent said module housing slotted section.

12. A vehicle air bag module as set forth in claim 11,
wherein each of said base members of said retaining ring include a plurality of downwardly extending tabs, and
wherein each of said base member portions of said module housing that are positioned in the same plane includes a plurality of holes positioned therein through which said downwardly extending tabs from said retaining ring extend when said retaining ring slotted sections are disposed adjacent said module housing slotted section.

* * * * *

UNITED STATES PATENT AND TRADEMARK OFFICE
CERTIFICATE OF CORRECTION

PATENT NO. : 5,290,059
DATED : March 1, 1994
INVENTOR(S) : Bradley W. Smith et al It is certified that error appears in the above-indentified patent and that said Letters Patent is hereby corrected as shown below:

Column 8, line 43, change "7" to —1—.
Column 9, line 6, change "1" to —7—.

Signed and Sealed this

Fourth Day of October, 1994

Attest:

BRUCE LEHMAN

*Attesting Officer*     *Commissioner of Patents and Trademarks*